United States Patent [19]

Charpak

[11] Patent Number: 5,521,956
[45] Date of Patent: May 28, 1996

[54] MEDICAL IMAGING DEVICE USING LOW-DOSE X- OR GAMMA IONIZING RADIATION

[76] Inventor: Georges Charpak, 2, rue de Poissy, 75005 Paris, France

[21] Appl. No.: 424,864

[22] Filed: Apr. 18, 1995

[30] Foreign Application Priority Data

Apr. 19, 1994 [FR] France .................................. 94 04642

[51] Int. Cl.⁶ ................................................. G01T 1/185
[52] U.S. Cl. ...................................... 378/146; 250/385.1
[58] Field of Search .............................. 378/146, 62, 19; 250/385.1, 374

[56] References Cited

U.S. PATENT DOCUMENTS

| | | |
|---|---|---|
| 4,317,038 | 2/1982 | Charpak . |
| 4,645,934 | 2/1987 | Allemand et al. ............... 250/385.1 X |
| 4,954,710 | 9/1990 | Comparat et al. .................... 250/385.1 |
| 4,973,846 | 11/1990 | Lanza et al. .......................... 250/385.1 |
| 5,223,717 | 6/1993 | Chapak ............................. 250/385.1 X |
| 5,347,131 | 9/1994 | Charpak ................................ 250/385.1 |

FOREIGN PATENT DOCUMENTS

4123871A1   1/1992   Germany .

OTHER PUBLICATIONS

Nuclear Instruments & Methods in Physics Research, Section—A: Accelerators, Spectrometers, Detectors and Associated Equipment, vol. 283, No. 3, 10 Nov. 1989, pp. 431–435, S. E. Baru et al, "Multiwire proportional chamber for a digital radiographic installation".

Nuclear Instruments & Methods in Physics Research, Section—A: Accelerators, Spectrometers, Detectors and Associated Equipment, vol. 310, No. 1/2, 1 Dec. 1991, pp. 545–551, B. T. A. McKee et al, "Data acquisition for a medical imaging MWPC detector".

Nuclear Instruments & Methods 156 (1978) 1–17: "Applications of Proportional Chambers to Some Problems in Medicine and Biology", by G. Charpak.

European Organization for Nuclear Research, "An Interesting Fall–Out of High–Energy Physics Techniques: The Imaging of X-rays at Various Energies for Biomedical Applications", by G. Charpak and F. Sauli, CERN, Geneva, Switzerland Apr. 1976.

European Organization for Nuclear Research, "The High–Density Multiwire Drift Chamber" by Jeavons et al. Nov. 1974.

Institute of Nuclear Physics, "Digital Radiographic Installation for Medical Diagnostics" by Babichev et al, Novosibirsk, 1989.

Primary Examiner—David P. Porta
Attorney, Agent, or Firm—Larson and Taylor

[57] ABSTRACT

A medical imaging device using X- or gamma ionizing radiation, provided with a source of radiation in a divergent beam diaphragmed by a slit and a module for detecting a beam transmitted by a body to be observed, illuminated by the beam. The detection module comprises a drift chamber and a multiwire chamber which are filled with a gas, these chambers comprising, in a direction orthogonal to the plane containing the slit and the illumination beam, a drift space for the electrons, an electron proportional multiplier grid for generating multiplied electrons and corresponding ions and a second cathode electrode making it possible to count the multiplied electrons by means of the corresponding ions for a plurality of directions of the sheet-form illumination beam.

9 Claims, 2 Drawing Sheets

MEDICAL IMAGING DEVICE USING LOW-DOSE X- OR GAMMA IONIZING RADIATION

The invention relates to a medical imaging device using low-dose X- or gamma ionizing radiation.

In the field of X-radiation medical imaging, a major problem has to date consisted in the difficulty absorption by the gas detectors with a probability close to 1 of the X-radiation used in medical imaging, without providing sufficiently large thickness dimensions these detectors, which impairs, on the one hand, the compactness of the corresponding equipment and, on the other hand, their resolution accuracy.

In the field of X-ray crystallography, the energies of this radiation used are of the order of 10 keV and the mean path of this radiation for a gas such as xenon exceeds several centimeters at atmospheric pressure, which makes it practically impossible to produce an accurate detector with large area and small thickness, without considerably increasing the pressure of the gas, which resultingly imposes practically prohibitive mechanical standards for constructing these detectors.

Various solutions have been proposed in order to attempt to overcome the abovementioned drawbacks.

A first solution consisted, for example, in placing the X-ray source at the centre of a spherical beryllium window which limits input to a gaseous space absorbing the X-rays. The rear face of the gaseous space, constituting a drift space for the electrons generated in the gaseous medium by the X-radiation, comprises a concentric grid placed a large distance, of the order of 10 cm, away. The volume of the drift space is filled with a gaseous mixture consisting predominantly of xenon. A potential difference is applied between the window and the output grid, which causes drifting of the ionization electrons released by a beam of the X-radiation emitted in a given direction in space, along a radius of the sphere. Suitable electric fields may then make it possible to locate these electrons by virtue of a multiwire chamber and thus to obtain an image whose accuracy is not impaired by the large thickness of the detector, because the response of the assembly is independent of the position of the absorption point of each X-ray photon along a radius of the spherical space. For a description of this mode of operation, reference may be made to the article entitled "Applications of proportional chambers to some problems in medicine and biology" published by G. CHARPAK, Nuclear Instruments and Methods 156 (1978) 1–17, North-Holland Publishing Co.—CERN, Geneva, Switzerland.

However, the aforementioned mode of operation cannot be envisaged for the field of medical imaging because it is then necessary to use X-rays whose energy is greater than 25 keV, the mean absorption length of these rays becoming prohibitive at atmospheric pressure.

Other solutions have been proposed. One of these consists in using thin sheets of heavy metals, making it possible to absorb the X-rays expediently. However, the electrons detached from these sheets by Compton or photoelectric effect have a much smaller mean path than the mean path of an X-ray. Consequently, in the case when it is desired to produce a detector locating the X- or gamma rays by means of locating the aforementioned detached electron, the gas detector being, for example, placed against the lead sheet, the actual efficiency of the process employed is in general between 1/1000 and 1/100.

In order to overcome this difficulty, it has been proposed to impact on the thin sheets under grazing incidence or, if appropriate, to provide structures consisting of sheets or tubes placed such that the Compton or photoelectric electrons extracted from the sheets or from the walls of the tubes penetrate into the gaseous spaces separating the sheets or filling the tubes and ionize the gas therein, the ionization electrons then being extracted then conveyed by an electric field into a drift space where a multiwire chamber can locate them. Such a mode of operation has been described, in particular, by the articles entitled "An interesting fall-out of high-energy physics techniques: the imaging of X-rays at various energies for biomedical applications" by G. CHARPAK and F. SAULI, CERN, Geneva Switzerland, April 1976 and "The high-density multiwire drift chamber" by G. CHARPAK, A. P. JEAVONS, R. J. STUBBS, CERN-Data Handling Division DD/74/31, November 1974.

These designs, of which there are different forms, aim to stack a large number of thin sheets, each having a low X-ray absorption efficiency, but proceeding so that only one multiwire chamber can locate the electrons extracted from hundreds of successive sheets which are thin enough to allow the electrons detached by the X-rays to leave.

Finally, a second solution, applied in medical radiography, has been described in the article published by E. A. BABICHEV, S. E. BARU, V. V. GRUSEW, A. G. KHABAKHPASHEV, G. M. KOLACHEV, G. A. SAVINOV, L. I. SEKHTMAN, V. A. SIDOROV, A. I. VOLOBUEV and entitled "Digital Radiographic Installation for Medical Diagnostics"—Institute of Nuclear Physics, Novosibirsk—1989. In this second solution, the emitted X-rays illuminating the body of an object or of a patient to be observed, are absorbed in a gaseous space filled by xenon under a pressure of 3 bar, this space being bounded by an straight slit made in a lead plate, forming a diaphragm and making it possible to generate a sheet-form illumination beam. The ionization electrons produced in this gaseous space by the absorbed X-rays drift under the effect of an electric field towards a multiwire chamber, the wires of which, in a plane parallel to a plane containing the sheet-form illumination beam delivered by the slit, are convergent towards the point X-ray emission source.

The result of this is that the ionization electrons originating from a beam of rays in the sheet-form beam emitted in a given direction by the source are concentrated onto a single wire in the multiwire chamber. Counting electronics makes it possible to determine the number of pulses on each wire, which makes it possible to obtain a measure of the intensity of the X-rays transmitted in each of the directions of the wires.

Since the measurements obtained in this way are spatially limited to the intensity of the X-rays of the sheet-form beam delivered by the slit, the latter and the source are displaced along the body to be observed in order to scan the entire body to be observed.

The above-described solution has, however, the following drawbacks.

In order to compensate for the gain variation in the chamber, caused by the divergence of the wires, it is necessary to vary the distance separating the anode wires from the grid or from the cathode plane, so as to keep the amplification around a wire constant.

Such devices therefore require very careful construction of the chamber and of the divergent wires, the detection accuracy of the assembly remaining connected with the constructional quality.

Furthermore, since the gain parameters are connected with the structure of the detection device, the wires diverging away from the direction of the X-ray emission source, the device described by the aforementioned article at best allows a mode of use adapted to one single defined configuration of the distance from the X-ray emission source to the body to be observed and to the detection chamber thus formed. It is not therefore possible to envisage varied applications or observational conditions as are sometimes required for medical observation operations.

The object of the present invention is to overcome the aforementioned drawbacks by implementing a medical imaging device using low-dose X- or gamma ionizing radiation in which, the amplification and the detection functions being made independent, radiation of different energies can be used without significantly limiting the energy levels of this radiation.

Another object of the present invention is to implement a medical imaging device using X- or gamma ionizing radiation in which, the amplification and detection functions being made independent, an increase in detection efficiency can be obtained, which consequently makes it possible to reduce the radiation doses necessary for complete observation of a patient.

Another object of the present invention is, finally, implementation of a medical imaging device using X- or gamma ionizing radiation in which, the amplification and detection functions being made independent, various observation conditions, in particular of distance from the ionizing radiation, can be implemented, which makes the aforementioned device very flexible to use.

The medical imaging device using low-dose X- or gamma ionizing radiation which forms the subject matter of the present invention comprises a source of ionizing radiation in a divergent beam, a longitudinal slit forming a diaphragm, making it possible to deliver a sheet-form illumination beam distributed substantially in a plane containing the longitudinal slit and making it possible to illuminate a body to be observed, and a detection module making it possible to detect the beam transmitted by the body to be observed.

It is noteworthy in that the detection module comprises a drift chamber and a multiwire chamber which are filled with a gas making it possible to generate electrons.

The chambers comprise, arranged in a direction orthogonal to the plane containing the slit and the sheet-form illumination beam, a drift space for the electrons, comprising a first cathode electrode, and an electron proportional multiplier grid for generating multiplied electrons and corresponding ions. A second cathode electrode is provided in the vicinity of the proportional multiplier grid in order to make it possible to count the multiplied electrons, by means of the corresponding ions, the counting being carried out for a plurality of directions of the sheet-form illumination beam.

The invention finds an application in medical imaging using X- or gamma ionizing radiation.

It will be better understood on reading the description and on regarding the following drawings, in which:

FIG. 1a diagrammatically represents an overall view of the medical imaging device which forms the subject matter of the present invention;

FIG. 1b represents a detail of the embodiment of the device represented in FIG. 1a;

FIG. 2 represents a first variant of the detection module used for implementing the medical imaging device represented in FIG. 1a;

FIG. 3a represents a second variant of the detection module used for implementing the medical imaging device represented in FIG. 1a;

FIG. 3b represents, along a section plane orthogonal to the plane containing the ionizing-radiation illumination beam, a sectional view of a detail of the detection module represented in FIG. 3a;

A more detailed description of a medical imaging device using low-dose X- or gamma ionizing radiation, according to the subject matter of the present invention, will now be given in conjunction with FIG. 1a and the following figures.

Figure 1A:
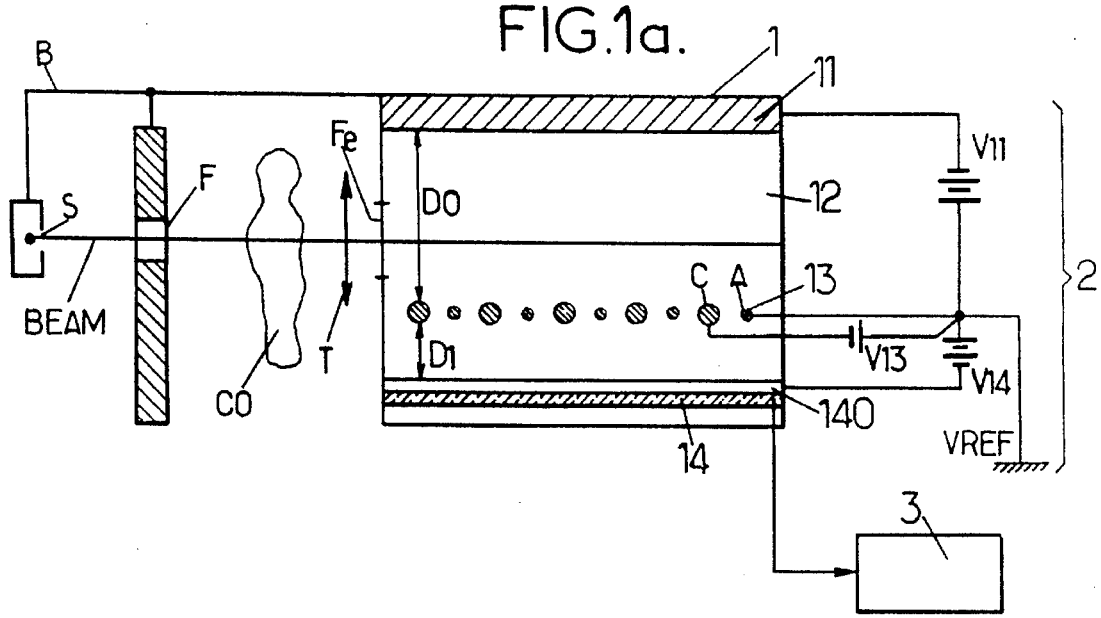

FIG. 1a represents a sectional view along a plane orthogonal to a plane containing the sheet-form ionizing-radiation illumination beam, the plane of the illumination beam thus being orthogonal to the plane of the sheet on which FIG. 1a is represented.

As represented in the aforementioned figure, it is indicated that device forming the subject matter of the present invention comprises a source, denoted S, of ionizing radiation which emits a divergent ionizing-radiation beam, and a longitudinal slit, denoted F, extending orthogonally to the plane of the sheet on which FIG. 1a is represented, this slit F forming a diaphragm and making it possible to deliver a sheet-form illumination beam. This sheet-form beam is, in the conventional manner, distributed substantially in a plane containing the longitudinal slit F and the source S. A detection module 1 is provided, this detection module making it possible to detect a beam transmitted by a body CO to be observed. This body CO is, for example, the body of a patient which is illuminated by the sheet-form illumination beam, the body to be observed then transmitting a transmitted ionizing-radiation beam which has undergone various absorptions as a function of the density of the body through which it has passed.

The detection module 1 is, of course, positioned so as to receive the transmitted ionizing-radiation beam. In the conventional manner, it is indicated that the source S, the slit F, and the detection module 1 may be solidly attached to a frame B which can be made movable in translation and in rotation with respect to the body CO to be observed, the translational and rotational movement of the assembly being symbolized by the arrow T in FIG. 1a.

According to a particularly advantageous aspect of the device forming the subject matter of the present invention, it is indicated that the detection module 1 successively comprises a drift chamber and a multiwire chamber, these chambers being filled with a gas making it possible to generate electrons subsequent to the illumination of this gas by the transmitted ionizing beam. In the conventional manner, it is indicated that the drift chambers and ionization chamber are filled with one and the same gas such as, for example, xenon, at a pressure higher than atmospheric pressure, so as to ensure a sufficient gas density.

It is indicated that the detection module 1 comprises a window Fe which makes it possible to input the transmitted illumination beam into the drift space of the drift chamber in order to ensure the creation of electrons by interaction of the ionizing radiation with the gas contained in the aforementioned drift space.

According to a particularly advantageous aspect of the device forming the subject matter of the present invention, it is indicated that the chambers, namely the drift chamber and multiwire chamber, forming the detection module 1 comprise, arranged in a direction orthogonal to the plane containing the slit F and the sheet-form illumination beam, and an electron drift space which is denoted 12, this drift space comprising, in the conventional manner, a first cathode electrode denoted 11. An electron proportional multiplier grid is also associated with the aforementioned drift space 12, this grid being denoted 13 and making it possible to generate multiplied electrons and corresponding ions by a localized avalanche phenomenon in the vicinity of the proportional multiplier grid.

The multiwire chamber furthermore comprises, in the vicinity of the proportional multiplier grid, but downstream thereof, in the drift direction of the electrons originating from the drift space, a second electrode forming a cathode electrode for the ions corresponding to the multiplied electrons generated by the proportional amplification phenomenon. This second cathode electrode makes it possible to count the multiplied electrons by means of the signals induced by the aforementioned corresponding ions for a plurality of directions of the sheet-form illumination beam, as will be described in more detail hereafter in the description. The second cathode electrode has the reference 14 and the proportional multiplier grid has the reference 13 in FIG. 1a.

In general, it is indicated that the proportional multiplier grid 13, the first cathode electrode 11 and the second cathode electrode 14 are formed in parallel planes.

Furthermore, and according to a particularly advantageous characteristic of the device forming the subject matter of the present invention, it is indicated that the drift chamber 12 and the multiwire chamber bounded by the proportional multiplier grid 13 are formed by an asymmetric chamber, as represented in FIG. 1a. Under these conditions, the drift space 12 has, in the direction orthogonal to the plane containing the slit and the illumination beam, a dimension D0 greater than the distance D1 in the same direction separating the multiplier grid 13 from the second cathode electrode 14.

As regards the proportional multiplier grid 13, it is indicated that the latter may advantageously be formed by a succession of straight electrically conductive wires, these straight wires consisting of first, small-diameter wires denoted A and second, larger-diameter wires denoted C, successively alternated in order to form the proportional multiplier grid. Typically, it is indicated that the small-section wires A constitute amplification anode wires and have a diameter of between 10 and 20 μm, whereas the larger-section wires, the wires C, actually constitute an amplifier cathode with respect to the wires A and have a diameter of between 40 and 60 μm.

Figure 1B:
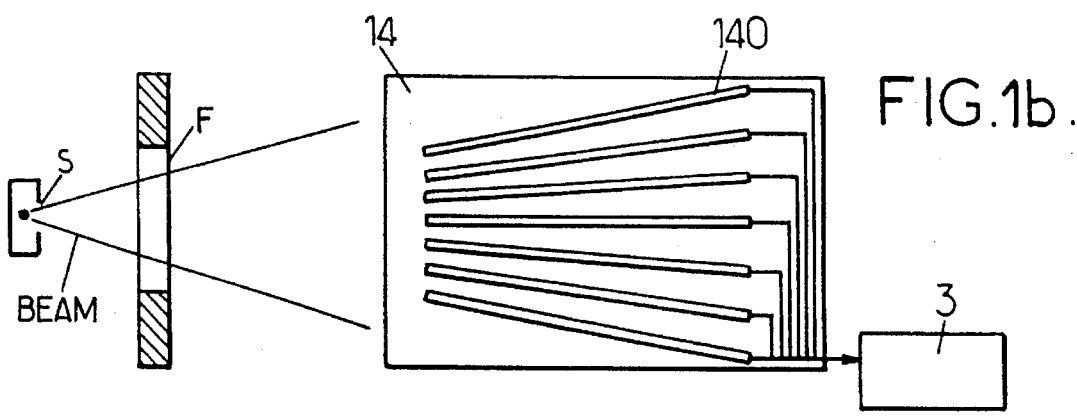

As regards the second cathode electrode 14, it is understood that the latter fulfils the function of a cathode electrode with regard to the corresponding ions generated by the proportional amplification of the electrons originating from the drift space. The second cathode electrode is advantageously formed, as represented in FIG. 1b, by a plurality of electrically conductive strips, denoted 140, which are deposited on an electrically insulating support. The strips 140 have a substantially constant width and may be produced using printed-circuit technology as microstrip lines of constant width of the order of 0.2 mm for example. The strips 140 extend along a plurality of directions of the illumination beam and converge towards the point of emission of the divergent illumination beam, that is to say towards the emission source S of the ionizing radiation.

As furthermore represented in FIG. 1a, it is indicated that a negative potential, denoted V11 is applied to the first cathode electrode 11, with respect to a reference potential denoted $V_{REF}$ corresponding to the earth potential of the installation. The potential V11 may, for example, be chosen to be equal to −10 kV.

Similarly, it is indicated that, the proportional multiplier grid 13 being itself formed by a succession of parallel electrically conductive wires fulfilling the successive function of alternate amplification cathodes and anodes, a negative potential with respect to the anode wires is applied to the amplification cathode wires, the wires C in FIG. 1a, whereas the reference potential $V_{REF}$ is applied to the amplification anode wires A. The potential of the amplification cathode wires C is denoted V13, it being possible for this potential V13 to be taken equal to −1 kV for example. In FIG. 1a, all the electrical circuits which make it possible to generate the electric potentials V11, V13 and V14 have the reference 2. These conventional circuits are not described in detail.

Finally, it is indicated that, for a drift space having a dimension D0 of the order of 5 mm, the space D1 separating the proportional multiplier grid 13 from the second cathode electrode 14 may be taken equal to 0.5 mm for example. It is also indicated that the aforementioned distance D1 substantially corresponds to the distance separating an amplification cathode wire C from an amplification anode wire A.

A potential V14 is applied to the second cathode electrode 14 and, in particular, to the electrically conductive strips 140 constituting the latter, which potential V14 is negative with respect to the reference voltage $V_{REF}$. The potential V14 may, for example, be taken equal to V14=−500 volts.

The medical imaging device forming the subject matter of the invention and, in particular, the detection module 1 operates as follows:

The electrons generated as a result of the illumination of the gas contained in the drift space by the transmitted illumination beam are attracted in the drift space 12 to the proportional amplifier grid 13.

The proportional amplifier grid 13 makes it possible, by virtue of its structure and its mode of operation, to generate proportional amplification of the electrons originating from the drift space 12 by an avalanche phenomenon in the gas contained in the latter. The proportional multiplier grid 13 allows rapid removal of the ions produced in the aforementioned avalanche around an anode wire A, which makes it possible to avoid the phenomenon of paralysis of the multiplier chambers by removal of the aforementioned slow ions and thus to obtain a high counting rate, as will be described hereafter. It is thus indicated that the high counting rate achieved makes it possible to increase the pressure of the gas inside the drift space and the multiwire chamber until reaching, if necessary, a pressure which is compatible with the mechanical strength of the assembly. The voltage applied to the amplification cathode wires C then makes it possible to remove the ions in the avalanche rapidly.

The corresponding ions generated make it possible to induce corresponding electrical pulses on the electrically conductive strips 140, which pulses then make it possible to locate the direction of the transmitted ionizing illumination radiation by counting the pulses thus induced on the aforementioned strips 140. Thus, each electrically conductive strip 140 constituting the second cathode electrode 14 is connected to a conventional counting device 3 which makes it possible to count the aforementioned pulses.

The major problem of eliminating the parallax error connected with the X- or gamma rays of a given direction, which yield their energy at different depths in a deep gas detector, is thus eliminated.

The structure as represented in FIGS. 1a and 1b may exhibit the following phenomenon because of the proximity of the second cathode electrode to the proportional amplifier grid 13, namely that the amplification anode wires are attracted to the second cathode which is approximately 0.5 mm away and may thus disrupt the parallelism between the abovementioned electrodes.

According to a particular aspect of the device forming the subject matter of the present invention and of the detection module 1, insulating filaments, for example made of glass or of plastic, may be placed every 2 cm along the amplification anode wires, perpendicularly to the latter, so as to separate the second cathode electrode 14 from the amplification anode wires A. Such an arrangement has a drawback that it periodically reduces the efficiency of the aforementioned amplification anode wires A. This drawback may be eliminated by positioning the insulating glass or plastic filaments at an angle of 45°, for example, with respect to the mean direction of the X-ray source. Thus, along the anode wires A, there are inefficiency zones of approximately 0.5 mm. However, the latter are not correlated with a particular direction of the X-ray beam and equally affect all directions. This is equivalent to a small reduction in the depth of the amplification chamber.

A major advantage of the detection module 1 described hereinabove is, in particular, that it is not necessary to vary the electric field in the chamber along the wires, this amplification being therefore constant. Furthermore, when it is desired to change the distance between the source S and the input window Fe of the detection module 1, it is sufficient to change the circuit consisting of the second cathode electrode 14 without changing any of the electrical connections or the mechanical structure of the assembly. In such a case, it is possible to provide a set of second cathode electrodes 14 having different angular resolutions, that is to say angular distances between the electrically conductive strips 140, as a function of the distance from the emission source S of the ionizing radiation.

Figure 2:
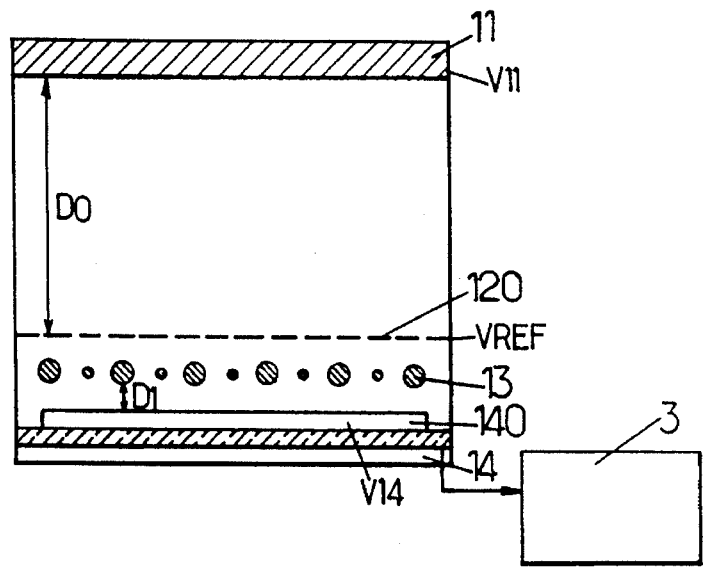

Furthermore, as represented in FIG. 2 in a particular embodiment of the detection module 1, the drift space 12 may furthermore be provided with an auxiliary grid electrode, denoted 120, which is transparent to the electrons generated and displaced in the drift space 12. The auxiliary electrode 120 is placed in the vicinity of the proportional amplifier grid 13 and, for example, a potential close to the potential of the amplification cathode wires C is applied to it. This auxiliary electrode makes it possible to adjust the electric field in the drift space and to decouple the latter from the amplification space proper by adjusting the value of the electric field in the drift space, while, clearly, allowing transmission of electrons to the proportional multiplier grid 13.

A more detailed description of another alternative embodiment of the detection module 1 will now be given in conjunction with FIGS. 3a to 3d.

According to a particularly advantageous characteristic of the device forming the subject matter of the present invention, the drift space 12 may be provided with an ionizing-ray/electron converter denoted 121, this converter consisting of a multichannel mechanical structure.

Figure 3A:
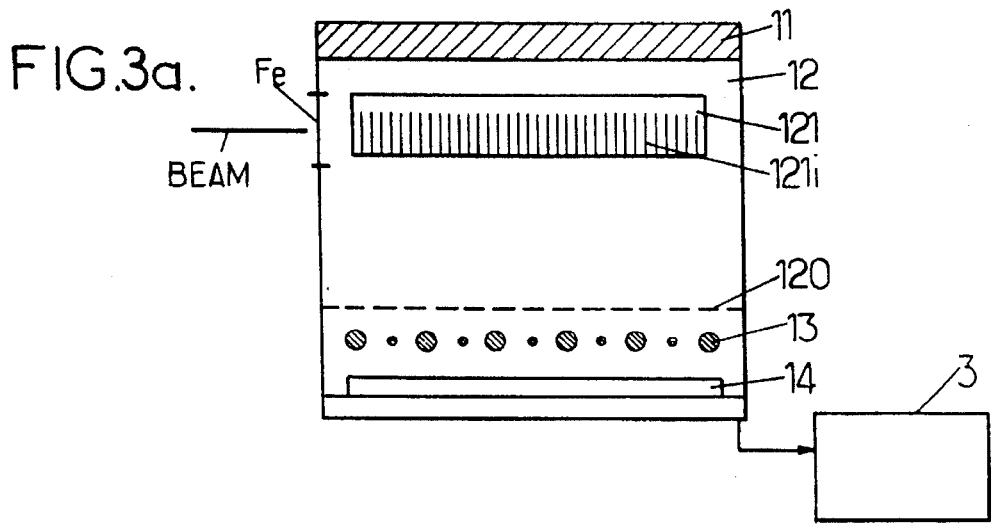

Practically, it is indicated that the aforementioned converter 121 is placed in the vicinity of the input window Fe for the transmitted ionizing radiation, as represented in FIG. 3a.

In general, it is indicated that the converter 121 consists of a multichannel mechanical structure, each channel extending longitudinally in a direction parallel to the direction orthogonal to the plane containing the longitudinal slit F and the sheet-form illumination beam, the channels thus extending in the direction of the electric field in the drift space 12. The channels have an open end, pointing towards the proportional multiplier grid 13 and towards the auxiliary grid 120 when the latter is provided.

Figure 3B:
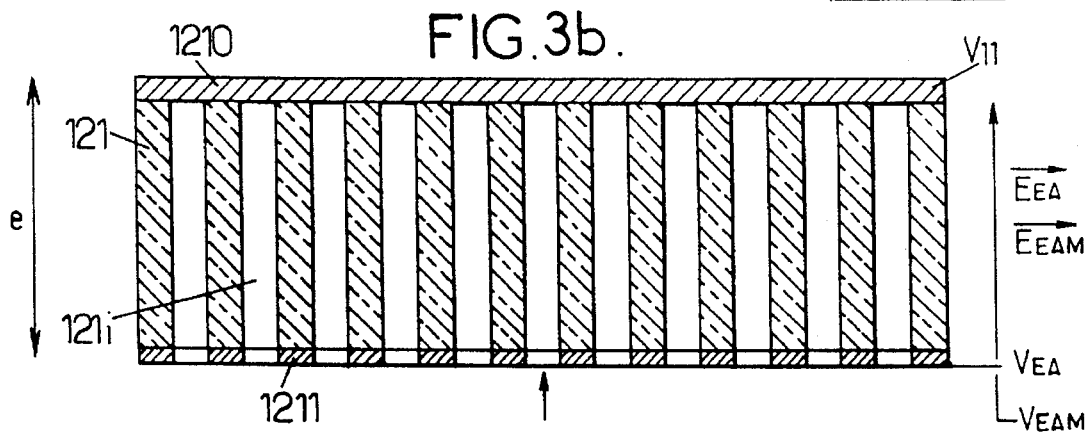

It is indicated that the multichannel structure 121 may be formed by parallel thin metal sheets made of a material such as lead, for example, of thickness 5 µm, the sheets being, for example, 0.5 mm apart, and have a dimensional depth e, as represented in FIG. 3b, of several centimeters.

The electrons detached from these sheets or from the multichannel structure thus formed, because of the ionizing radiation and the impact thereof on the aforementioned sheets, ionize the gas contained between two successive sheets, this space practically constituting a channel, and the ionization electrons are extracted from the space by virtue of the electric field existing in the drift space 12. The aforementioned electrons then drift to the proportional amplifier multiwire chamber, as previously described in the description.

As furthermore represented in FIG. 3b, it is indicated that the structure 121 may also be produced by a lead glass material, for example, the anterior face of the structure having a metallization 1210 being, for example, bonded onto the first cathode electrode 11 and therefore having the potential V11 previously mentioned in the description applied to it.

In this case, a very thin and highly resistive lead layer is formed at the surface of the tubes so that the electric potential is distributed along the walls of the tube while generating an electric field parallel to the tube.

A metal layer 1211 may be provided on the posterior face having the opening of the channels, to which layer an electric potential, denoted $V_{EA}$ may be applied, this potential making it possible to extract the electrons from the channels 121i arranged in the mechanical structure 121. The electric potential may be a larger electric potential, denoted $V_{EAM}$, making it possible not only to extract the electrons but also to multiply them by avalanche phenomenon in order to produce a larger amplification gain at the multiplier grid 13. The extraction and multiplication electric potential $V_{EAM}$ may, for example, be taken equal to a few hundreds of volts with respect to the aforementioned potential V11.

Typically, it is indicated that the extraction potential $V_{EA}$ or extraction and avalanche-multiplication potential $V_{EAM}$ may be chosen so as to create corresponding electric fields $E_{EA}$, $E_{EAM}$ of respective amplitudes 100 V/mm and 1000 V/mm. The corresponding electric fields, parallel to the sheets, may be generated by means of the devices described in the articles, relating to the prior art, previously mentioned in the description.

Figure 3C:
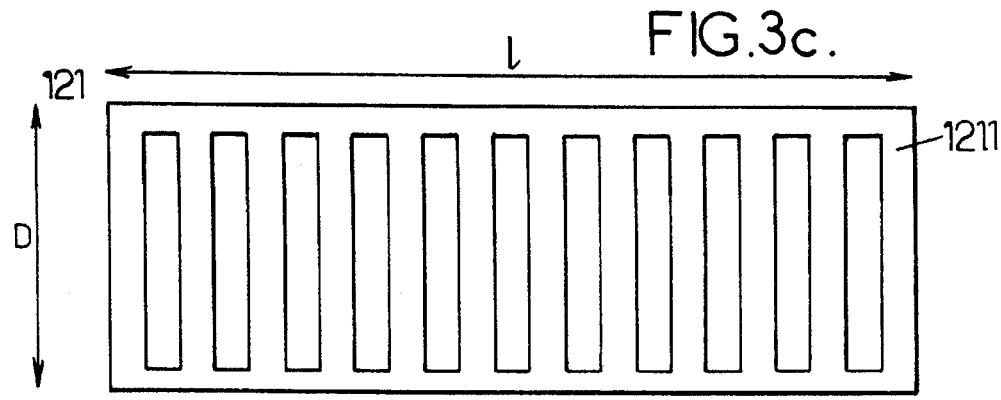
FIGS. 3c and 3d represent a front view of FIG. 3b according to two separate alternative embodiments.
Figure 3D:
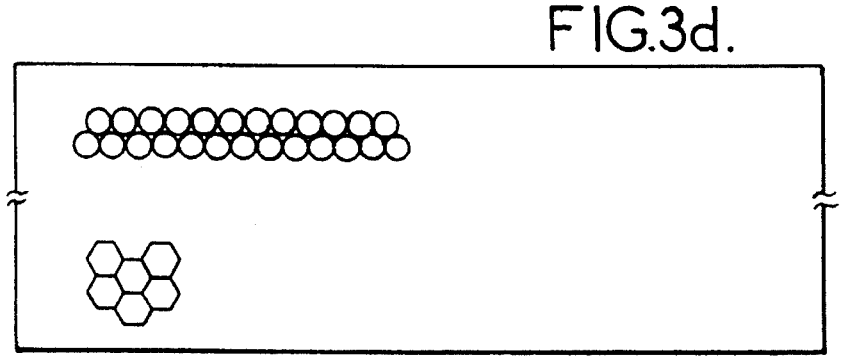

FIG. 3c represents a front view, symbolized by the arrow in FIG. 3b, each of the channels 121i being arranged between two successive sheets. As regards the dimension D of the mechanical structure 121, it is indicated that this substantially corresponds to the aperture of the window Fe in the plane containing the sheet-form beam or the transmitted illumination beam.

It is also indicated that, as represented in FIG. 3c according to a front view of FIG. 3b, the multichannel structure 121 may have a honeycombed structure in order to increase the efficiency of the assembly. In such a case, the mechanical structure 121 may be produced by means of small thin glass tubes with a diameter of the order of 80 µm, for example. As regards the electrically conductive layer 1211, it is indicated that this may be produced by a semi-conducting surface, for example, in order to make it possible to establish the electric field allowing extraction and/or multiplication of the electrons in each channel 121i.

In general, it is indicated that the dimension e of the mechanical structure 121 may be taken equal to that of the slit F, that is to say of the order of 1 mm, which, clearly, makes it possible to facilitate the extraction of the electrons generated in the multichannel structure thus produced.

A description has thus been given of a medical imaging device using low-dose ionizing radiation which is particularly advantageous in comparison with gas detectors consisting of a drift space insofar as, because of the dissociation of the processes of amplification proper, by proportional amplification by means of a multiwire chamber, and of detection, this device is perfectly suited to medical imaging using high-energy X-radiation or gamma rays, these rays normally requiring a large length of xenon under high pressure in order to allow absorption permitting detection of the latter.

In particular, the medical imaging device which forms the subject matter of the present invention allows very great flexibility of use insofar as, by virtue of its intrinsic characteristics, it can be employed easily for various observation distances with respect to the emission source of the ionizing radiation by simply changing the second cathode electrode.

I claim:

1. Medical imaging device using a low-dose, X- or gamma ionizing radiation, comprising a source of ionizing radiation in a divergent beam, a longitudinal slit forming a diaphragm, making it possible to deliver a sheet-form illumination beam, distributed substantially in a plane containing the longitudinal slit and detection means for detecting a beam transmitted by a body to be observed, illuminated by the sheet-form illumination beam, wherein said detection means comprise a drift chamber and a multiwire chamber which are filled with a gas making it possible to generate electrons, said chambers comprising, arranged in a direction orthogonal to the plane containing the slit and the sheet-form illumination beam:

a drift space for the electrons, comprising a first cathode electrode, an electron proportional multiplier grid for generating multiplied electrons and corresponding ions, and, in the vicinity of said proportional multiplier grid, a second cathode electrode making it possible to count the multiplied electrons by means of the corresponding ions for a plurality of directions of the sheet-form illumination beam.

2. Device according to claim 1, wherein the proportional multiplier grid and the first and second cathode electrodes are formed in parallel planes.

3. Device according to claim 1, wherein said drift chamber and said multiwire chamber are formed by an asymmetric chamber, said drift space having, in the direction orthogonal to said plane containing the slit and the illumination beam, a dimension greater than the distance, in the same direction, separating the multiplier grid from the second cathode electrode.

4. Device according to claim 1, wherein said second cathode electrode comprises a plurality of electrically conductive strips deposited on an electrically insulating support, said strips, of constant width, extending along a plurality of directions of the illumination beam and converging towards the point of emission of the divergent beam.

5. Device according to claim 1, wherein said drift space being arranged between the first cathode electrode and the said proportional multiplier grid, said proportional multiplier grid being itself formed by a succession of parallel electrically conductive wires fulfilling the successive functions of alternate multiplier cathodes and anodes, a negative potential is applied to the first cathode electrode, a negative potential, with respect to the anode wires, is applied to the multiplier cathode wires, a reference potential is applied to the multiplier anode wires and a negative potential is applied to the second cathode electrode.

6. Device according to claim 1, wherein said drift space comprises an auxiliary grid electrode, making it possible to adjust the electric field in said drift space.

7. Device according to claim 1, wherein said drift space comprises an ionizing-ray/electron converter consisting of a multichannel mechanical structure, each channel in the multichannel structure extending longitudinally in a direction parallel to said direction orthogonal to said plane containing the longitudinal slit and the sheet-form illumination beam and having an open end directed towards the proportional multiplier grid.

8. Device according to claim 7, wherein said multichannel structure is formed by a material which absorbs the ionizing radiation, in which parallel microchannels are formed, the face opposite the open end of each channel being closed and comprising an electrically conductive coating to which a defined potential is applied in order to generate, in each channel of the multichannel structure, an electric field making it possible to extract the electrons and introduce them into the drift space.

9. Device according to claim 7, wherein an electric potential is applied to the face of the mechanical structure comprising the open ends of the channels, making it possible to generate multiplication of the electrons by electron avalanche in the said channels.

* * * * *